Feb. 7, 1928.

C. S. BRAGG ET AL

1,658,325

SAFETY CONTROL FOR POWER ACTUATED BRAKE MECHANISM

Filed Feb. 4, 1925 5 Sheets-Sheet 3

Feb. 7, 1928.  1,658,325
C. S. BRAGG ET AL
SAFETY CONTROL FOR POWER ACTUATED BRAKE MECHANISM
Filed Feb. 4, 1925  5 Sheets-Sheet 5

INVENTORS
Caleb S. Bragg
Victor W. Kliesrath
BY Louis Prevost Whitaker
ATTORNEY

Patented Feb. 7, 1928.

BEST AVAILABLE COPY 1,658,325

UNITED STATES PATENT OFFICE.

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK.

SAFETY CONTROL FOR POWER-ACTUATED BRAKE MECHANISM.

Application filed February 4, 1925. Serial No. 6,733.

Our invention consists in the novel features hereinafter described, reference being had to the accompanying drawings which show a variety of forms or embodiments of the invention selected by us for purposes of illustration, and the said invention is fully disclosed in the following description and claims.

In the operation of automotive vehicles, and especially in the operation of automotive buses, it is becoming increasingly desirable to provide some means by which a passenger from a position remote from the driver's seat can bring the vehicle to a stop when for any reason it becomes necessary as in case of reckless driving, the intoxication of the driver, or illness or injury rendering the driver helpless. We have recently invented a power actuator for applying the brake mechanism of an automotive vehicle under the control of the usual foot lever, the power being furnished preferably by suction brought about by a connection from the actuator to the intake manifold or other suction passage of the internal combustion engine furnishing the motive power for propelling the vehicle. One example of such, a power actuator and its application to the brake mechanism of an automotive vehicle, is illustrated in our former application for Letters Patent of the United States, filed December 22, 1923, Serial No. 682,346. This type of power actuator is particularly adapted for use in connection with our present invention, and comprises, briefly, an actuator cylinder, a double-acting piston therein having a hollow piston rod connected with the brake mechanism, reversing valve mechanism for placing the cylinder on one side of the piston in communication with the source of suction and the cylinder on the other side of the piston in communication with the atmosphere, and vice versa, the said valve mechanism being operated by a longitudinally movable actuating part or valve sleeve having a limited longitudinal movement with respect to the piston rod and piston, and being connected with the usual foot lever provided with a retracting spring, the arrangement being such that a movement of the valve sleeve in either direction with respect to the piston will effect the movement of the piston in the same direction and to the same extent, the valve sleeve being held normally in neutral position and the piston being held normally in retracted position, when the parts are in the "at rest" or "off" position.

According to our present invention we provide means, such, for example, as an emergency cord in or extending through the passenger compartment of the automotive vehicle within reach of any of the passengers therein and connected with the power actuator in such manner that without assistance from or interference by the driver or operator of the vehicle, the power actuator may be brought into operation to apply the brakes and stop the vehicle. The emergency cord may be directly connected to the operator's foot lever or to the connections between the foot lever and the valve actuating part or sleeve. According to the preferred form of our invention, mechanism is provided in connection with the hollow piston rod, whereby the reversing valve mechanism may be instantly operated, shifting the valve sleeve with respect to the piston, to apply the brakes. Our invention also includes provision operable by the emergency cord or other device and simultaneously with the operation of the brake applying mechanism for disconnecting the ignition mechanism of the engine and operating a warning signal, as by operating the usual horn with which the vehicle is provided, or any other special form of signalling device. We prefer to employ mechanism for this purpose which when called into action, will positively keep the brakes applied until the vehicle comes to a stop, without the possibility of interference from the driver or operator of the vehicle who may readily restore apparatus to normal condition, after the vehicle has stopped. Such device may also be so constructed that the brakes will be applied so long as the passenger retains his hold on the emergency cord or other emergency device, and the apparatus may be automatically restored to normal condition upon the release of the emergency cord or other device. Our invention also contemplates the simultaneous operation with the brake mechanism of means for fully closing the throttle valve of the engine, thereby providing the maximum suction or rarification in the suction passages of the engine, including the intake manifold, so as to insure the maximum suction to operate the brakes in the most positive manner. This furthermore effects the throttling of the motor whenever the brakes are applied. In addition to the operation of the brakes by the passenger our invention also contemplates the automatic operation of the brake mechanism under various conditions by the abnormal operation of parts of the automotive vehicle or its equipment; for example, the brake applying mechanism may be called into action whenever the door or doors of the vehicle are open, so that the vehicle may not be started until all of the doors are properly closed, while the brakes will be in any event applied when the doors are open to prevent possible injury to passengers by alighting or entering the bus or vehicle when in motion, and preventing the possibility of the bus running away should the operator leave the vehicle without properly setting the emergency brakes. In such an installation if, as may be the case, the operating devices are controlled by an electric circuit, in connection with a switch operated by the door or doors, the said circuit would desirably be connected with the ignition circuit switch in such manner that the switching off or breaking of the ignition circuit would also break the circuit through the door actuating switches, and thus prevent the batteries being run down while the bus or vehicle is not in operation and the door is left open.

By employing suitable electric circuits and electrically operated emergency means, also operable by an emergency cord or the like, for applying the brakes, our invention may also be arranged to automatically control the speed of the vehicle so that it may not be operated beyond a predetermined speed. This is conveniently accomplished by combining the proper contacts with the speedometer or with a governor operated by the speed of the vehicle. In such an installation we prefer to locate the ignition switch out of reach of the operator so that he cannot defeat the purposes of the speed control mechanism by throwing out the clutch or gears and shutting off the ignition, thereby stopping his motor and depriving the brake mechanism of its suction, and in such case we prefer to locate the emergency cord, or a portion thereof, within easy reach of the driver, so that he may be able to stop the motor at any time by this means.

Our invention also includes the automatic operation of the emergency mechanism to apply the brakes in case the pressure in the oil gauge falls below the pressure at which the motor can be safely run without risk of injury, by combining suitable means, as an electric contact with the oil gauge for this purpose. As the oil pressure drops when the motor is stopped, this circuit should be controlled by the ignition switch in the manner previously described in order to prevent the batteries from being run down, while the vehicle is not in use. As there is not sufficient suction ordinarily in the intake manifold to apply the brakes by means of the actuator when the engine is being started, at which time the oil pressure is also abnormally low, the brakes would not be applied ordinarily at cranking speeds of the motor. If, however, the oil pressure should not rise properly when the motor is started, the brake would be applied as soon as sufficient suction existed, and would not be released until the necessary oil pressure had been obtained, thereby preventing damage through lack of lubrication due to cold oil or other reasons.

Our invention also contemplates the operation of the emergency mechanism to the application of the brakes by means of the ordinary motor temperature gauge used for indicating the temperature of the cooling water in the radiator; for example, by means of a suitable electric contact closed automatically when the temperature indicated indicates a temperature of the water above that at which the engine can be safely operated, thus applying the brakes and holding them applied until the temperature has fallen below the danger point, by the addition of cold water to the radiator or otherwise.

Our invention also provides a means of closing the throttle whenever the brake is applied, by the emergency or safety devices mentioned.

Our invention also includes certain new and useful combinations of parts hereafter particularly described and claimed.

Referring to the accompanying drawings.

Figure 1:
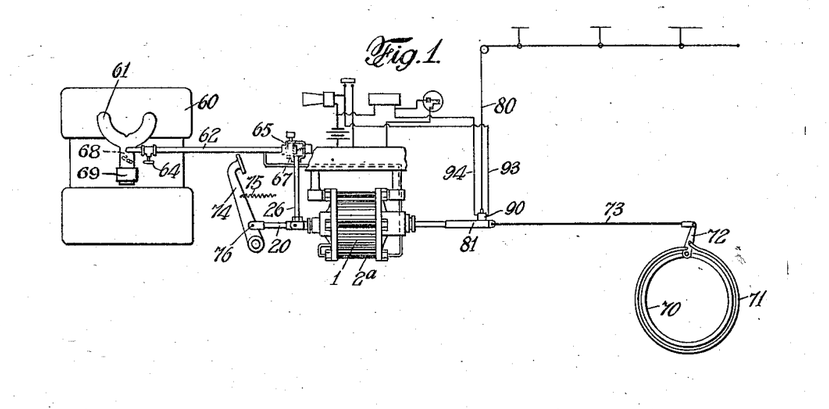
Fig. 1 is a diagrammatic view illustrating the general arrangement of the brake mechanism of an automotive vehicle with the power actuator therefor and the internal combustion engine from which the suction is obtained, the operator operated control device, the emergency control apparatus and circuits.
Figures 2, 5:
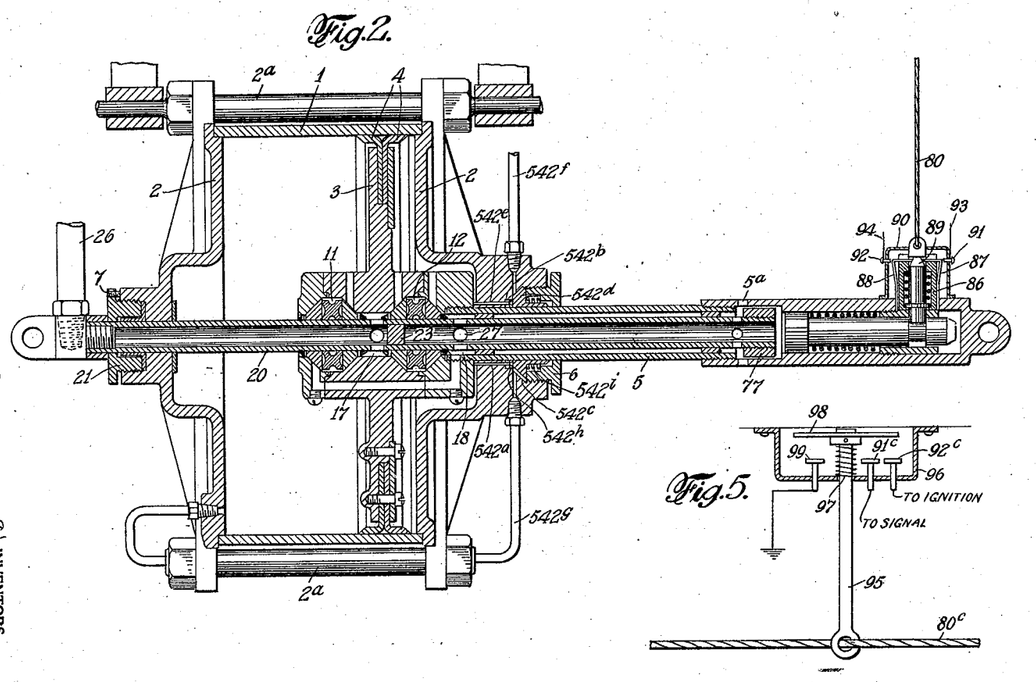
Fig. 2 is an enlarged sectional view of one form of our improved power actuator and emergency controlling means therefor.
Fig. 5 is a detail of one form of support for the emergency cord, having control contacts for the ignition circuit and warning signal operatively connected therewith.
Figure 3:
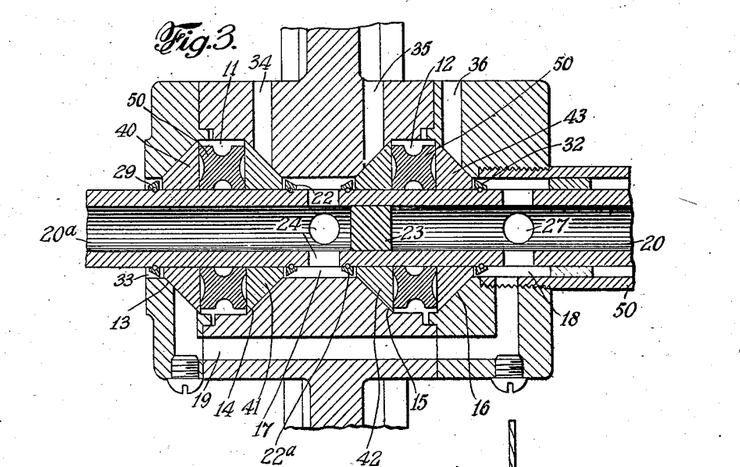
Fig. 3 is an enlarged view of the reversing valve mechanism of the actuator.

In Figs. 1, 2 and 3 of the accompanying drawings we have shown a power actuator adapted to be operated by suction from the intake manifold of the internal combustion engine. The particular construction of the power actuator herein shown and described forms no part of our present invention, as the same is covered by our former application for Letters Patent of the United States, filed November 22, 1924, and given Serial Number 751,481, but in order that our present invention may be properly understood, we will briefly describe the construction and operation of the power actuator shown herein, in connection therewith.

Referring, therefore, to Figs. 1, 2 and 3, 1 represents the cylinder of our improved actuator closed at its opposite ends by heads 2, connected by tubular bolts 2ª, and nuts. 3 represents the double-acting piston provided with oppositely disposed gaskets 4—4. 5 represents a hollow piston rod which extends through a stuffing box 6, in one end of the cylinder, and is provided at its inner end with threaded portions screwed into the hub of the piston and secured. The hub of the piston is provided with two valve chambers 11 and 12 respectively, each of which is provided with two valve seats preferably conical and concentric to the axis of the piston. The valve chamber 11 is shown provided with conical valve seats 13 and 14, and the valve chamber 12 is similarly provided with valve seats 15 and 16. The piston hub is provided in this instance between the valve chambers with an outlet chamber or lower pressure chamber indicated at 17, which communicates with each of the valve chambers through the valve seats 14 and 15 respectively. The piston hub is also provided with a higher pressure chamber 18 (in this instance communicating with the atmosphere). The chamber 18 communicates with the valve seat 16, and by a narrow passage 19, with the valve seat 13, at the opposite end of the piston hub. 20 represents the valve actuating part, consisting in this instance, of a valve sleeve passing through a stuffing box 21, in the cylinder hub at the opposite end of the cylinder from the stuffing box 6, said sleeve also extending longitudinally through the piston hub, the chambers thereof and through the hollow piston rod 5, and is movable longitudinally with respect thereof to a limited extent. The valve sleeve is divided interiorly into two parts, by means of a plug 23, forced into the sleeve to a point adjacent to the suction chamber and the part of the sleeve on one side of this plug (at the left as shown) is provided with one or more lateral passages 24, communicating with the suction chamber 17. The outer end of this portion of the sleeve 20 is provided with a lateral outlet passage 26, communicating with the source of suction. The portion of the valve actuating sleeve on the other side of the plug 23, (to the right as shown) is provided with an aperture 27, communicating with the higher pressure chamber 18, and this portion of said sleeve 20 communicates with the interior of the hollow piston rod 5, which is provided outside of the cylinder with suitable air inlet apertures 5ª, thus placing the chamber 18 of the valve mechanism in communication with the atmosphere. The suction chamber 17 is adapted to be connected with the cylinder on opposite sides of the piston by means of ports 34, in valve seat 14, and ports 35 in the valve seat 15. In connection with the chamber 18, the valve seat 16 is provided with ports 36, communicating with the cylinder on one side of the piston and chamber 18 is connected by passage 19 to the valve seat 13, which communicates with the cylinder on the other side of the piston through an annular passage 33. Each of the valve chambers is provided with a pair of oppositely disposed poppet valves, preferably conical, engaging the valve seats and being loose on the valve actuating sleeve. The valves are indicated at 40, 41, 42 and 43. These valves are held seated in this instance by cushions 50, of elastic rubber interposed between two adjacent valves and making a frictional contact with the engaged portions of said valves and the valve sleeve so as to serve the combined purpose of seating and retracting spring and sealing means. The valve actuating sleeve is provided with collars, 29, 32, 22 and 22ª, secured thereto, each of which is located adjacent to the outer face of one of the valves, and by a movement of the valve sleeve in either direction longitudinally, one valve of each pair will be opened.

Referring to Fig. 1, 60 represents the internal combustion engine of an automotive vehicle, providing the customary suction passage from the carburetor 69 between the throttle valve indicated at 68 and cylinders through the usual intake manifold indicated at 61, which forms the most convenient source of suction for operating the power actuator. In this instance the intake manifold is connected between the throttle valve and the cylinders of the engine by pipe 62, with the reversing valve mechanism of the actuator through the hollow valve actuating sleeve 20, through the lateral orifice 26 therein, and an adjustable regulating valve 64, a check valve 65 and vent valve 67, being preferably located in said pipe. As herein shown the air will be exhausted from the cylinder of the actuator on both sides of the piston as soon as the engine is started, and this may be accomplished in various ways as set forth in our application for U. S. Letters Patent filed January 5, 1925, and given Serial Number 506. In this instance the head of the cylinder against which the hub of the piston comes to rest when the actuator is in the "off" or normal position (at the right of Figs. 2 and 3) is provided with a passage or passages 542ª communicating with a recess 542ᵇ, in which is located a valve seat 542ᶜ, engaged by a movable valve 542ᵈ. The valve seat 542ᶜ is connected by a pipe 542ᵍ with the opposite side of the cylinder, and the valve 542ᵈ when in closed position, therefore, cuts off communication between the recess 542ᵇ, and the interior of the cylinder on both sides of the piston. The valve seat 542ᶜ is also provided with a port connected by a branch pipe 542ᶠ, with the suction pipe 62, so as to connect the suction pipe with the cylinder on both sides of the piston when the valve is open. The valve is preferably provided with a retracting spring 542ⁱ and is operated by a ring 542ʰ, provided with one or more projections 542ᵉ, extending into the cylinder far enough to be struck by the piston head when the piston returns to its normal position so as to ensure the opening of the valve 542ᵈ. As a partial vacuum is thus maintained within the actuator cylinder on both sides of the piston therein when the actuator piston is in off position and when the valve mechanism is moved to effect the operation of the actuator and apply the brakes, the immediate result is that atmospheric air rushes into one end of the cylinder and effects the operation of the piston without any appreciable quantity of air being actually withdrawn from the cylinder and admitted to the intake manifold, and the air admitted in rear of piston is withdrawn gradually under the control of the regulating valve on the return stroke of the piston, after which the valve 542ᵈ opens and the air admitted in restoring the piston to its normal or "off" position is withdrawn through pipe 542ᶠ, thus maintaining a partial vacuum on both sides of the piston in the "off" or "at rest" position.

70 represents one of the brake drums of the ordinary brake mechanism, 71 the brake band and 72 the lever for applying and releasing the brake band, which lever is connected by a link 73, to the hollow piston rod of the actuator. 74 represents the foot lever which is provided with a retracting spring 75, and is connected by a link 76, with the valve actuating sleeve 20.

As before stated, the valve sleeve is permitted a limited amount of lost motion or movement with respect to the piston in order to set the reversing valve mechanism for movement in the required direction. This limitation of motion may be accomplished in any desired manner. In the present instance the valve sleeve is provided with a collar 77, having a limited movement in a recess in the housing of the emergency device hereinafter described. It follows from this construction that should the power actuator fail for any reason, the foot lever may be operated so as to mechanically move the piston and apply the brakes by the physical power of the operator.

The parts so far described do not in their particular details of construction constitute any part of our present invention.

Figure 10:
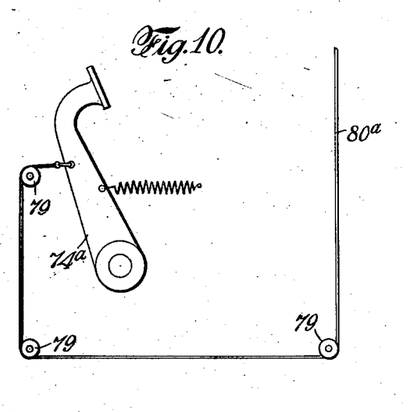
Fig. 10 is a detail view of a modification in which the emergency cord is connected directly with the foot lever.

The simplest form of emergency control mechanism herein illustrated is probably that shown in Fig. 10, in which 74ª represents the foot lever and 80 represents an emergency cord illustrated diagrammatically and which may extend in any usual or desired manner through a bus or vehicle, one end being secured, for example, to a stationary part, and the other end being connected with the foot lever 74ª, passing over a suitable pulley, or pulleys, 79, in such manner that a pull on the emergency cord, 80ª, by any passenger within the bus, or vehicle, will depress the foot lever, thereby actuating the reversing valve mechanism and instantly applying the brake mechanism. Thus the passenger may apply the brakes and stop the vehicle in case of accident, injury to, or illness of the operator, or in case he is driving recklessly through being intoxicated, or otherwise, the only effort being required is that to overcome retracting spring, 75.

Figure 11:
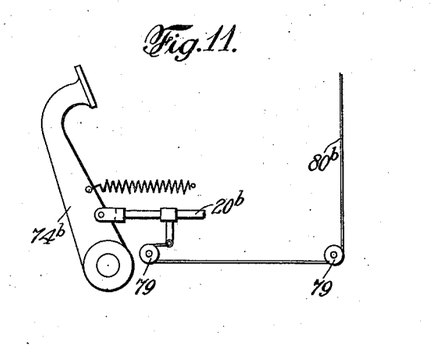
Fig. 11 is a detail view of a further modification in which the emergency cord is connected with the reversing valve mechanism of the actuator.

In Fig. 11 we have shown a slightly modisleeve here indicated at 220 with respect to the piston to apply the brakes. In this instance the housing 81$^b$ of the emergency device is provided with an actuating lever pivoted therein, having an arm 82$^b$, to which the emergency cord 80$^e$ is attached, the said lever being provided with an arm 83$^b$ for engaging the end of the valve sleeve 220. The said lever is provided with a retracting spring 84$^b$ for normally holding it in operative position.

Figure 8:
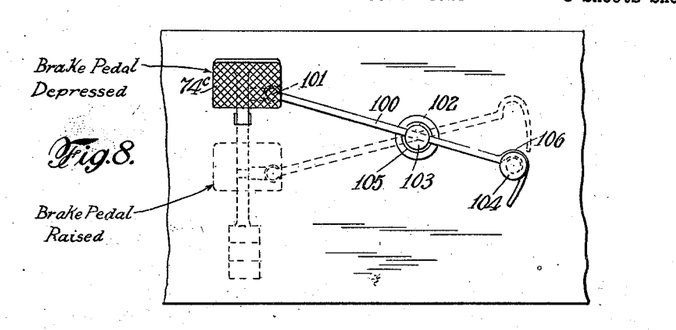
Fig. 8 is a plan view of one form of mechanism for insuring the closing of the throttle valve when the power actuator is called into operation to apply the brakes.
Figure 9:
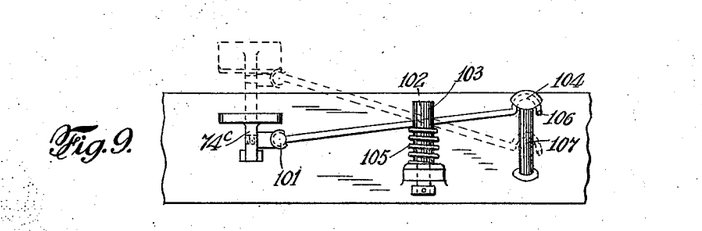
Fig. 9 is an elevation of the part shown in Fig. 8.

In Figs. 8 and 9 we have illustrated one form of apparatus for effecting the closing of the throttle valve and throttling of the engine when the brake is applied. Ordinarily when an automotive vehicle is being driven, the hand throttle is in either a closed or nearly closed position and the supply of fuel to the engine is regulated entirely by the mushroom plug or other form of foot controlled valve actuating mechanism connected to the throttle valve in the usual manner. In this instance we have shown an arm indicated at 100, connected to the under side of the foot brake pedal by a ball and socket joint indicated at 101, the central portion of the rod 100, being supported by passing it through a slot 102, in a similar stud or pin 103, pivotally secured to the floor support or other support between the pedal and the mushroom pin or accelerator 104, the pin 103 being surrounded by or containing a coil spring 105. The rod 100 is also provided with a curved or slotted portion 106, adapted to be brought into engagement with the stem 107, of the mushroom plug or accelerator 104, beneath the head of the plug, as the foot lever here indicated at 74$^c$ is depressed, and the further depression of the foot lever positively elevates the accelerator pin, permitting the throttle valve to close under the action of the retracting spring with which it is customarily provided. As the distance the foot pedal travels varies with the adjustment and wear of the brakes, the coil spring 105 surrounding or contained in pin 103, permits the curved or slotted end of the rod 100 to engage the under side of the accelerator button as soon as the pedal has been sufficiently depressed to bring that end of the rod in engagement with the stem of the accelerator. The spring 105 is sufficiently strong to lift the accelerator button even under the weight of the operator's foot but will be compressed when the brake pedal is further depressed, to avoid straining the parts. It is obvious that without this spring it would be impossible to further depress the foot brake after the accelerator is fully raised without bending the rod or breaking the accelerator pedal. The curved or slotted end of the rod 100 is made sufficiently long or the accelerator button sufficiently large that they will engage whenever the foot pedal is depressed to prevent the curved end of the arm 100 passing above the accelerator button, should the accelerator or the throttle be depressed or open when the brake is applied by foot or emergency cord. Fig. 8 illustrates the rotary motion of the swivel pin 103 and shows that the curved or slotted end of the rod 100 is entirely clear of the foot of the accelerator when the brake pedal is in the "off" position, permitting the accelerator to be operated to its full extent. Obviously when the emergency devices herein referred to are brought into operation to apply the brakes, the foot lever will be depressed and by means of the rod 100 and its connections, the throttle valve will be closed even though the operator's foot might be pressing upon the accelerator, either intentionally or where the operator has been taken with some serious illness while at the steering wheel. This insures the closing of the throttle valve, whether the operator wills it or not, and insures the highest degree of suction so long as the engine continues to turn over, as it will by the forward movement of the vehicle until the latter actually stops, the clutch and gears not having been disengaged.

The mechanism shown in Figs. 8 and 9 is not claimed herein, except in combination with the emergency device, as it is also shown and described in our application Serial No. 117,026, filed June 19, 1926, now Patent 1,633,360 in which it is broadly claimed.

Figures 12, 13, 14:
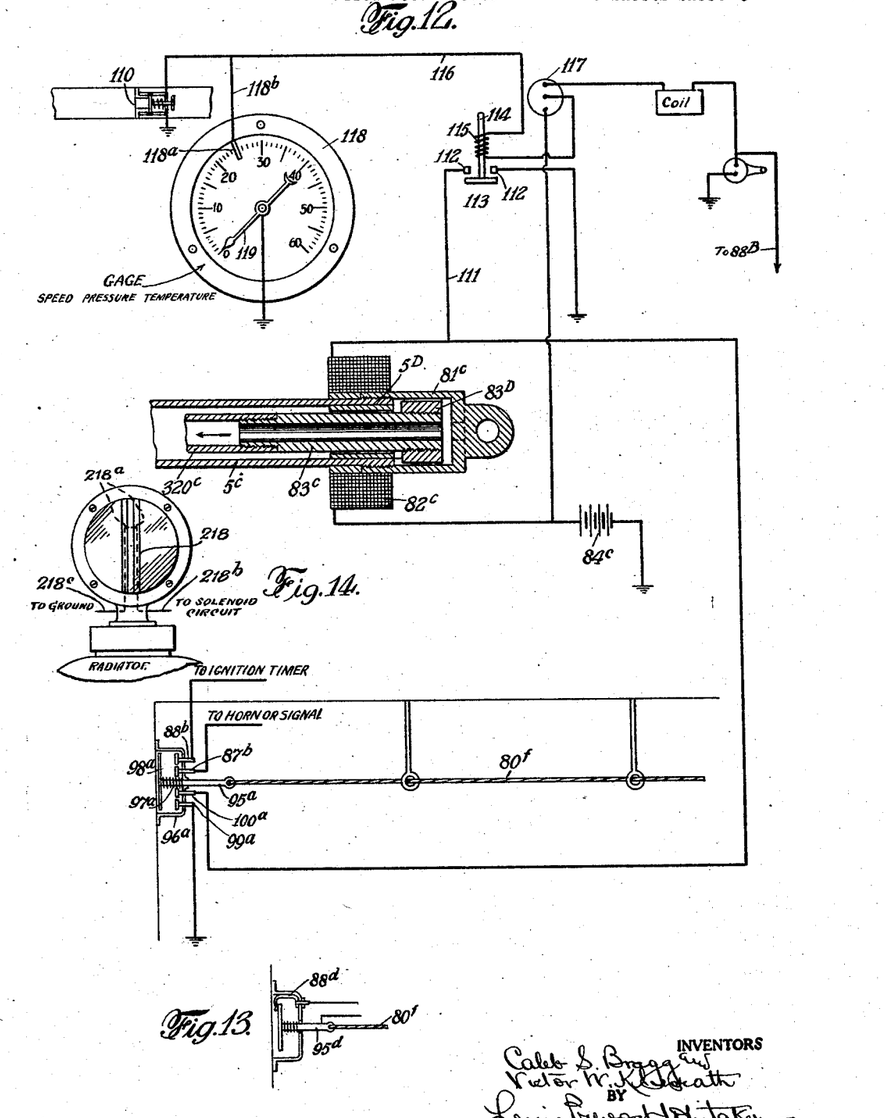
Fig. 12 is a schematic view showing electrically operated emergency control apparatus and a circuit diagram illustrating the manner in which it may be called into operation by door operated switch, emergency switch or automatically by the operation of a suitable gauge for indicating speed, pressure or temperature.
Fig. 13 is a detail of a modified form of the emergency controlling switch shown in Fig. 12.
Fig. 14 is a detail view of a temperature indicator provided with means for operating emergency control apparatus.

In Fig. 12 we have illustrated another form of control device for the brake applying mechanism of our power actuator in which the housing 81$^e$ made of non-magnetic material and arranged on a hollow piston rod is indicated at 5$^c$ and provided with a solenoid indicated at 82$^c$. 5$^d$ which is a part of 5$^c$ is of soft iron and represents one of the poles of the magnetic circuit. The core 83$^c$ is made of a non-magnetic material and attached thereto is an armature 83$^d$ made of soft iron and is connected to and forms part of the valve actuating rod 20$^c$, so that the passage of current from the battery 84$^c$ through the coil 82$^c$ will cause the pole 5$^d$ to become magnetized and attract armature 83$^d$ and cause valve sleeve to be moved in the direction of the arrow in Fig. 12, thereby shifting the reversing valves of the actuator and applying the brakes in the manner previously described. In this instance we have shown the emergency cord 80$^f$, which extends through the vehicle, as connected to an electric contact device 96$^a$ provided with a sliding stem 95$^a$, carrying a contact 98$^a$ and normally held in inoperative position by a spring 97$^a$, the housing of insulated material being provided with a ground contact 99$^a$, a warning signal contact 87$^b$, an ignition contact 88$^b$ for grounding or opening the magneto or battery ignition circuit, or short-circuiting the timer of either the magneto or battery ignition circuit, and the fourth contact 100ᵃ which is connected with the solenoid 82ᶜ. In Fig. 12 we have shown these contacts in the ignition circuit normally open or separated and adapted to be brought together to close a circuit and ground a magneto or short circuit the battery ignition interrupter. In Fig. 13 we have illustrated a slight modification of the switch in which the parts are similar to those in Fig. 12, with the exception of contact, 88ᵇ, which in Fig. 12 is normally open. In Fig. 13 we have shown the ignition circuit normally closed by contacts 88ᵈ and 95ᵈ, and adapted to be separated to break or open a battery or magneto ignition circuit, which can be accomplished for example, in the following manner. The ground would be removed from the ignition breaker and a wire connected from that terminal to 88ᵈ, so that the circuit would be completed through contact, 88ᵈ, to ground, instead of direct to ground as shown in Fig. 12. This is such ordinary practice that it is unnecessary to illustrate it in detail. Thus, on pulling the emergency cord, 80ᶠ, the solenoid will be energized so as to shift the reversing valve mechanism of the actuator and apply the brakes and simultaneously the ignition circuit will be cut out and a horn or signal operated. We may also very conveniently combine with this form of our invention other controlling devices than the emergency cord, and in the present instance we have illustrated a door switch, indicated at 110, in a circuit including an electrical circuit closer for the solenoid circuit. In this instance we have shown a wire, 111, in circuit between the solenoid and ground, and provided with a pair of contacts, 112, adapted to be closed by a bridge contact, 113, carried by a core, 114, of a solenoid, 115, connected by the wire, 116, to a door actuated switch, 110. With this arrangement the opening of the door will permit the switch, 110, to close, thus energizing the solenoid, 115, and closing the circuit through the main solenoid, 82ᶜ, and thereby applying the brakes (and closing the throttle valve if the construction illustrated in Figs. 8 and 9 is used), without operating the horn, or other signal, and without rendering the ignition circuit inoperative. The brakes will remain on so long as the door is open. In order to prevent running down the batteries in case the door is open and the engine is not running, we prefer to connect the solenoid, 115, with the main ignition switch, indicated at 117, so that when the ignition switch is operated to stop the engine, the door switch circuit will be broken, but as soon as the ignition switch is thrown in to operative position and the engine started, the brakes would be immediately applied if the door were open, and would remain until the door is closed. One or more doors of the vehicle may be provided with a switch, 110.

In connection with the electrically operated emergency control mechanism, we also contemplate combining it with automatic governing or controlling means, so that the brakes will be automatically applied in case of certain contingencies, as the speed of the vehicle in excess of a predetermined speed, decrease in oil pressure below a point where the engine can be safely operated, or an increase of temperature of the cooling water in the radiator above a temperature at which the engine can be safely operated. All that is necessary to accomplish these results is to provide the speedometer or the pressure gauge of the oil system of the internal combustion, or the temperature indicating gauge of the radiator with a suitable contact so that the pointer or other movable indicating medium of the gauge or indicator will make contact therewith and close a circuit, as the circuit through wire, 116, and solenoid, 115, when a predetermined condition exists, for example, in Fig. 12, we have illustrated a gauge, at 118, provided with a movable pointer, 119, connected to ground in this instance, the gauge being provided with a contact, 118ᵃ, connected by wire, 118ᵇ, with the wire, 116, extending to the solenoid, 115. Assuming that the gauge is a speedometer, and that the contact, 118ᵃ, is placed at the indication corresponding with twenty-five miles an hour, when the speed of the vehicle moves the pointer into contact with the contact, 118ᵃ, the solenoid, 115, would be instantly actuated, thereby closing the circuit through the solenoid, 82ᶜ, and immediately closing the throttle (if used) applying the brake, both of which would be released as soon as the car slowed sufficiently to bring its speed below the predetermined rate. The horn or other signal, and the ignition switch are not affected by the operation of the automatic control device. Thus, the driver of the vehicle would be unable to operate the vehicle above the speed for which the indicator was set. In this installation we prefer to locate the ignition switch out of reach of the operator, as he might defeat the purposes of the control of speed, by throwing out the clutch or gears, then shutting off the ignition and stopping the motor, which would release the brake by depriving it of its source of suction and permit the operator to coast down long hills at speeds in excess of those desired or allowed. In this case it would also be desirable to locate the emergency cord within easy reach of the driver so that he would be enabled to stop the motor by means of the emergency cord which controls the ignition, warning signal and brake mechanism.

In the same manner as herein shown the solenoid, 82°, may be controlled by the oil gauge by arranging a contact, like the contact, 118ª, in position to engage the pointer or other movable part of the indicator, when the pressure of the oil falls below the pressure at which the motor can be safely run. In this case should the oil pressure fall to a dangerous degree, the brake would be applied and the vehicle stopped. The driver would readily discover the cause of the application of the brakes and take the necessary steps to secure the proper oil pressure before operating the motor further. As the oil pressure drops when the motor is stopped, it is desirable that this circuit be connected with and controlled by the main ignition switch so that the circuit will be broken when the ignition circuit is broken, as previously described with reference to the door switch, so as to prevent the batteries being run down while the vehicle is not in use. When starting the motor there is not sufficient suction in the intake manifold to apply the brake ordinarily, and when the engine is cranked in starting it, the brakes would probably not be applied when the main ignition switch, 117, is first closed. If the oil pressure does not rise when the motor is started, so as to be above the danger point, the brake would be applied, and throttle closed (if this feature were used) as soon as the necessary suction was obtained, and would not be released until the necessary oil pressure had been obtained, thereby preventing damage through lack of lubrication, which may be due to cold oil, lack of oil, defective pumping action, or other reasons.

In like manner the solenoid, 82°, may be connected with the temperature gauge which indicates the temperature of the water in the radiator, in any well known or usual manner, according to the character of the gauge or temperature indicator, so as to close the throttle or apply the brakes and stop the vehicle when the motor is being operated at too high a temperature and the temperature of the water in the radiator has risen above the predetermined point. This provision of contacts in connection with the temperature gauge or indicator for actuating the solenoid, not only prevents the operation of the engine and vehicle after the radiator water has reached a temperature greater than the predetermined temperature, but also prevents the operation of the engine until the temperature has fallen below the danger point, which may be accomplished by allowing the engine to cool or by the addition of cold water, or otherwise. In Fig. 14, we have shown a temperature indicator, 218, provided with contacts, 218ª, connected with wires, 218ᵇ and 218°, leading to the solenoid (see Fig. 12) and to the ground respectively, the circuit being adapted to be closed for example by the mercury in the indicator.

Figure 4:
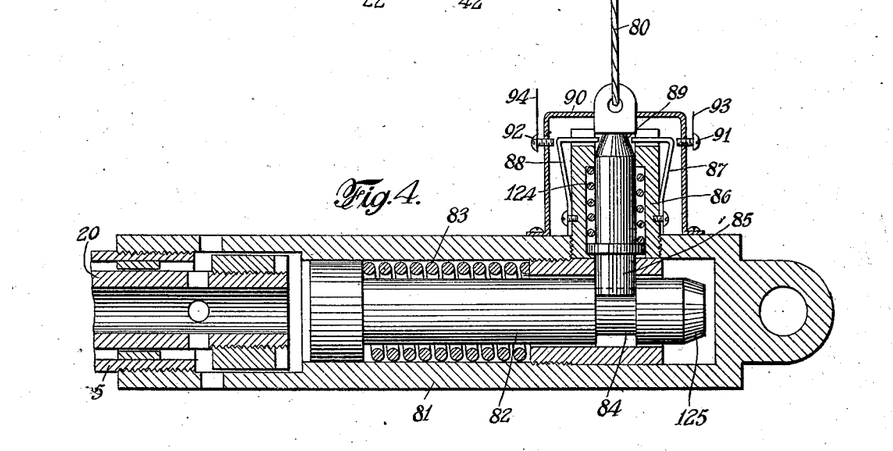
Fig. 4 is an enlarged sectional view of the emergency control device illustrated in Fig. 2.
Figure 6:
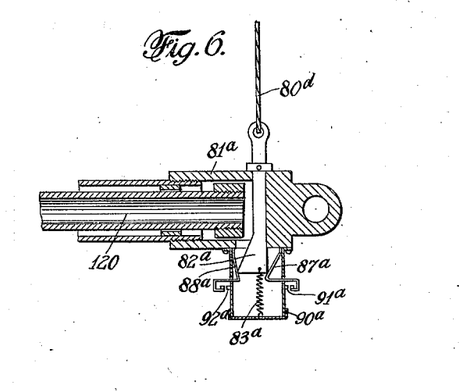
Fig. 6 is a detail sectional view of a modified form of emergency mechanism adapted to be combined with the power actuator.
Figure 7:
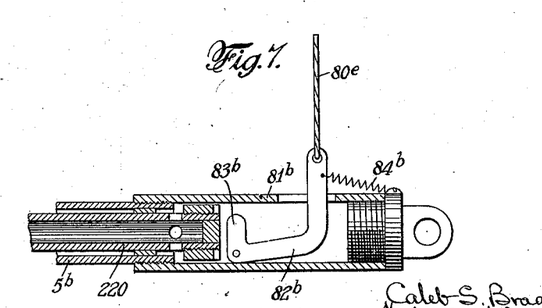
Fig. 7 is a similar view of another modified form.

It will be noted that in all forms of the apparatus, the operator cannot defeat the emergency device whether actuated automatically, or by a passenger pulling on the emergency cord. In all forms where the emergency device is brought into action by a passenger pulling the emergency cord, the apparatus cannot be restored to its normal condition so long as the passenger holds the emergency cord. In certain instances, as shown and described, however, the apparatus will be restored to normal condition as soon as the passenger releases the emergency cord, while in some instances the apparatus cannot be restored to normal position, even after the release of the emergency cord, until the vehicle is brought to a stop and the emergency device is reset, as in the case of the construction illustrated in Figs. 2 and 4, and in which if the foot pedal is pulled up the spring, 83, will be compressed by the valve sleeve, 20, striking the plunger, 82, and the locking bolt, 85, will be raised by the cam, 25, and forced into the groove, 84, of the plunger, by the spring 24. As hereinbefore stated, where the emergency device is actuated by a door switch, or indicator switch, the brakes only will be actuated and will be released automatically as soon as the door is closed or the indicator point recedes from the critical position.

What we claim and desire to secure by Letters Patent is:—

1. In an automotive vehicle, the combination with an internal combustion engine, provided with a throttle valve, a suction passage between the throttle valve and cylinder, said vehicle being provided with brake mechanism, a power actuator including a cylinder and piston, a connection from the actuator cylinder to said suction passage, valve mechanism for controlling the actuator, an operator operated part, operable by the driver for normally controlling said valve mechanism, of an independent emergency control means for said actuator for enabling the brakes to be applied by said actuator independent of the driver, and connections between the brake applying mechanism and throttle valve for effecting the closing of the throttle valve when the brake is applied, to reduce to minimum the explosive charges admitted to the engine cylinders, and at the same time insure maximum suction to operate the actuator.

2. In an automotive vehicle, the combination with an internal combustion engine, provided with a throttle valve, operator operated means for normally controlling the throttle valve, a suction passage between the throttle valve and cylinder, said vehicles being provided with brake mechanism, a power actuator, including a cylinder and piston, a connection from the actuator cylinder to said suction passage, valve mechanism for controlling the actuator, an operator operated part, operable by the driver for normally controlling said valve mechanism, means operated by the brake applying mechanism for taking the throttle valve operating part out of the control of the operator, and effecting the closing of the throttle valve when the brake mechanism is actuated to insure maximum suction for the actuator and to reduce to minimum the explosive charges admitted to the engine cylinders, of an independent emergency control means for said actuator for enabling the brakes to be applied by said actuator independent of the driver.

3. In an automotive vehicle, the combination with an internal combustion engine, provided with a throttle valve, means for normally controlling the throttle valve, including a foot operated accelerator, and a retracting spring for normally closing the throttle valve, a suction passage between the throttle valve and cylinder, said vehicle being provided with brake mechanism, a power actuator including a cylinder and piston, a connection from the actuator cylinder to said suction passage, valve mechanism for controlling the actuator, an operator operated part operable by the driver for normally controlling said valve mechanism, connections from said operator operated part to the accelerator for positively retracting the accelerator and permitting the throttle valve to close, of an independent emergency control means for said operator operated part for enabling the brakes to be applied by said actuator independent of the driver.

4. In an automotive vehicle, the combination with brake mechanism, a fluid pressure operated power actuator for actuating the brake mechanism, valve mechanism for controlling the actuator, a foot lever operatively connected with said valve mechanism, and provided with a retracting spring normally holding the actuator and brake mechanism in off position, an independent emergency control device for actuating said valve mechanism, and constructed to overcome the retracting spring of the foot lever, and means independent of the foot lever for bringing said emergency device into operation.

5. In an automotive vehicle, the combination with brake mechanism, a fluid pressure operated power actuator for actuating the brake mechanism, valve mechanism for controlling the actuator, a foot lever operatively connected with said valve mechanism, and provided with a retracting spring normally holding the actuator and brake mechanism in off position, an independent emergency control device for actuating said valve mechanism, and constructed to overcome the retracting spring of the foot lever, and means located in a passenger compartment of the vehicle for bringing said emergency device into operation.

6. In an automotive vehicle, the combination with brake mechanism, a fluid pressure operated power actuator for actuating the brake mechanism, valve mechanism for controlling the actuator, a foot lever operatively connected with said valve mechanism, and provided with a retracting spring normally holding the actuator and brake mechanism in off position, an independent emergency control device for actuating said valve mechanism, including a plunger, and means for actuating said plunger to overcome said retracting spring of the foot lever and apply the brakes, and means out of control of the driver of the vehicle for bringing said emergency device into operation.

7. In an automotive vehicle, the combination with brake mechanism, a fluid pressure operated power actuator for actuating the brake mechanism, valve mechanism for controlling the actuator, a foot lever operatively connected with said valve mechanism, and provided with a retracting spring normally holding the actuator and brake mechanism in off position, an independent emergency control device for actuating said valve mechanism, including a plunger, a spring for actuating the plunger, of greater power than the retracting spring for the foot lever, a retaining device for the plunger holding it normally out of operation, and means outside of the control of the driver of the vehicle for releasing the plunger from said retaining device.

8. In an automotive vehicle, the combination with brake mechanism, a fluid pressure operated power actuator for actuating the brake mechanism, valve mechanism for controlling the actuator, a foot lever operatively connected with said valve mechanism, and provided with a retracting spring normally holding the actuator and brake mechanism in off position, an independent emergency control device for actuating said valve mechanism, including a plunger, a spring for actuating the plunger, of greater power than the retracting spring for the foot lever, a locking device normally holding the plunger in retracted position, and an emergency cord connected with the locking device and extending into a passenger compartment of the vehicle.

9. In an automotive vehicle, the combination with an internal combustion engine, ignition mechanism therefor, brake mechanism, a fluid pressure operated power actuator for actuating the brake mechanism, valve mechanism for controlling the actuator, a foot lever operatively connected with said valve mechanism, and provided with a retracting spring normally holding the actuator and brake mechanism in off position, an independent emergency control device for actuating said valve mechanism, including a plunger, a spring for actuating the plunger, of greater power than the retracting spring for the foot lever, a locking device normally holding the plunger in retracted position, an emergency cord connected with the locking device and extending into a passenger compartment of the vehicle, a signalling device for said vehicle provided with an electric circuit, an electric circuit for putting the ignition mechanism of the engine out of operative condition and controlling devices for said circuits normally in inoperative condition, operatively connected with said locking mechanism and adapted to be brought into operative condition by the actuation of said locking mechanism to release the plunger.

10. In an automotive vehicle, the combination with an internal combustion engine, brake mechanism, a fluid pressure operated power actuator for actuating the brake mechanism, valve mechanism for controlling the actuator, a foot lever operatively connected with said valve mechanism, and provided with a retracting spring normally holding the actuator and brake mechanism in off position, an independent emergency control device for actuating said valve mechanism, including a plunger, and means for actuating said plunger to overcome said retracting spring of the foot lever and apply the brakes, and mechanism operated by a door of the vehicle for bringing said plunger into operative condition to secure the application of the brake mechanism by the actuator.

11. In an automotive vehicle, the combination with brake mechanism, a fluid pressure operated power actuator for actuating the brake mechanism, valve mechanism for controlling the actuator, a foot lever operatively connected with said valve mechanism, and provided with a retracting spring normally holding the actuator and brake mechanism in off position, an independent emergency control device for actuating said valve mechanism, including a plunger, and means for actuating said plunger to overcome said retracting spring of the foot lever and apply the brakes, electro-magnetic apparatus for bringing about the operation of said plunger, a switch controlling said electro-magnetic apparatus adapted to be moved into an inoperative condition when a door of the vehicle is closed and to be brought into operative condition by the opening of the door to apply the brake mechanism of the vehicle independently of the operator.

12. In an automotive vehicle, the combination with brake mechanism, a fluid operated power actuator for actuating the brake mechanism, valve mechanism for controlling the actuator, a foot lever operatively connected with said valve mechanism, and provided with a retracting spring normally holding the actuator and brake mechanism in off position, an independent emergency control device for actuating said valve mechanism, including an electro-magnetic apparatus for bringing about the operation of the actuator independently of the operator, an electric circuit for said electro-magnetic apparatus, and a door operated switch in said circuit adapted to bring said electro-magnetic apparatus into operation by the opening of the door.

13. In an automotive vehicle, the combination with brake mechanism, a fluid operated power actuator for actuating the brake mechanism, valve mechanism for controlling the actuator, a foot lever operatively connected with said valve mechanism, and provided with a retracting spring normally holding the actuator and brake mechanism in off position, an independent emergency control device for actuating said valve mechanism, including an electro-magnetic apparatus for bringing about the operation of the actuator independently of the operator, an electric circuit for said electro-magnetic apparatus, and a door operated switch in said circuit adapted to bring said electro-magnetic apparatus into operation by the opening of the door, and controlling means for said electro-magnetic device, including a part within a passenger compartment of the vehicle, for effecting the operation of the actuator to apply the brakes.

14. In an automotive vehicle, the combination with brake mechanism, a fluid pressure operated power actuator for actuating the brake mechanism, valve mechanism for controlling the actuator, a foot lever operatively connected with said valve mechanism, and provided with a retracting spring normally holding the actuator and brake mechanism in off position, an independent emergency control device for actuating said valve mechanism, including a plunger, and means for actuating said plunger to overcome said retracting spring of the foot lever and apply the brakes, a solenoid for operating the plunger to actuate said valve mechanism and apply the brake mechanism, an emergency switch in circuit with said solenoid, and means within reach of a passenger in the passenger compartment of the vehicle for operating said switch.

15. In an automotive vehicle, the combination with an internal combustion engine, brake mechanism, a fluid pressure operated power actuator for actuating the brake mechanism, valve mechanism for controlling the actuator, a foot lever operatively connected with said valve mechanism, and provided with a retracting spring normally holding the actuator and brake mechanism in off position, an independent emergency control device for actuating said valve mechanism, including electro-magnetic apparatus for bringing about the operation of the actuator, a door operated switch for controlling said electro-magnetic apparatus, said switch being operatively connected with the ignition circuit switch for the engine so as to be rendered inoperative when the ignition circuit switch is in open or off position, to prevent drain on the source of electrical energy when the door is open and the engine is stopped.

16. In an automotive vehicle, the combination with an internal combustion engine, brake mechanism, a fluid pressure operated power actuator for actuating the brake mechanism, valve mechanism for controlling the actuator, a foot lever operatively connected with said valve mechanism, and provided with a retracting spring normally holding the actuator and brake mechanism in off position, an independent emergency control device for actuating said valve mechanism, including electro-magnetic apparatus for bringing about the operation of the actuator to apply the brake mechanism, and automatic controlling means for said magnetic apparatus, including an indicating instrument provided with a movable part, and normally separated contacts adapted to be brought into engagement by the movement of said movable indicator part, to apply the brakes and secure the release of the brakes on the movement of said movable part to separate said contacts.

17. In an automotive vehicle, the combination with brake mechanism, a fluid pressure operated power actuator for actuating the brake mechanism, valve mechanism for controlling the actuator, a foot lever operatively connected with said valve mechanism, and provided with a retracting spring normally holding the actuator and brake mechanism in off position, an independent emergency control device for actuating said valve mechanism, an indicator carried by said vehicle, and operative connections between the indicator and the emergency device for automatically bringing the emergency control device into and out of operation.

18. In an automotive vehicle, the combination with brake mechanism, a fluid pressure operated power actuator for actuating the brake mechanism, valve mechanism for controlling the actuator, a foot lever operatively connected with said valve mechanism, and provided with a retracting spring normally holding the actuator and brake mechanism in off position, an independent emergency control device for actuating said valve mechanism, an indicator carried by said vehicle, and operative connections between the indicator and the emergency device for automatically bringing the emergency control device into and out of operation, and a manually operated means for bringing the emergency device into operation, including a part extending into a passenger compartment of the vehicle.

19. In an automotive vehicle, the combination with an internal combustion engine, brake mechanism, a fluid pressure operated power actuator for actuating the brake mechanism, valve mechanism for controlling the actuator, a foot lever operatively connected with said valve mechanism, and provided with a retracting spring normally holding the actuator and brake mechanism in off position, an independent emergency control device for actuating said valve mechanism, an indicator carried by said vehicle, and operative connections between the indicator and the emergency device for automatically bringing the emergency control device into and out of operation, a manually operated means for bringing the emergency device into operation, including a part extending into a passenger compartment of the vehicle, and a door operated controlling device for said emergency control mechanism adapted to be brought into operation by the opening of the door of the vehicle.

20. In an automotive vehicle, the combination with brake mechanism, a fluid pressure operated power actuator for actuating the brake mechanism, valve mechanism for controlling the actuator, a foot lever operatively connected with said valve mechanism, and provided with a retracting spring normally holding the actuator and brake mechanism in off position, an independent emergency control device for actuating said valve mechanism, including a solenoid plunger, a solenoid for actuating the plunger against the retracting spring of the foot lever, an electric circuit for said solenoid, a controlling switch in said circuit for operating the solenoid, manually operable devices in a passenger compartment of the vehicle for operating said switch, means operated by the opening of a door of the vehicle for operating said switch, and an indicating instrument carried by the vehicle, and operatively connected with said switch for automatically operating the solenoid.

21. In an automotive vehicle, the combination with an internal combustion engine, ignition mechanism therefor, brake mechanism, a fluid pressure operated power actuator for actuating the brake mechanism, valve mechanism for controlling the actuator, a foot lever operatively connected with said valve mechanism, and provided with a retracting spring normally holding the actuator and brake mechanism in off position, an independent emergency control device for actuating said valve mechanism, including a plunger, a solenoid for actuating the plunger against the retracting spring of the foot lever, an electric circuit for said solenoid, a switch for controlling the solenoid and simultaneously rendering the ignition circuit of the engine inoperative, and means out of the control of the operator for actuating said switch.

22. In an automotive vehicle, the combination with brake mechanism, a fluid pressure operated power actuator for actuating the brake mechanism, valve mechanism for controlling the actuator, a foot lever operatively connected with said valve mechanism, and provided with a retracting spring normally holding the actuator and brake mechanism in off position, an independent emergency control device for actuating said valve mechanism, a speedometer on said vehicle, and operative connections between the speedometer and said emergency device for bringing the emergency device into operation when the vehicle obtains a predetermined speed to apply the brakes, and to effect the release of the brakes when the speed of the vehicle falls below said predetermined speed.

23. In an automotive vehicle, the combination with brake mechanism, a fluid pressure operated power actuator for actuating the brake mechanism, valve mechanism for controlling the actuator, a foot lever operatively connected with said valve mechanism, and provided with a retracting spring normally holding the actuator and brake mechanism in off position, an independent emergency control device for actuating said valve mechanism, including electro-magnetic devices, a circuit therefor, a speedometer carried by the vehicle and provided with contacts in said circuit for actuating said electro-magnetic devices to apply the brakes automatically when the vehicle attains a predetermined speed, and to effect the release of said brakes when the speed of the vehicle falls below said predetermined speed.

24. In an automotive vehicle, the combination with an internal combustion engine, and ignition mechanism therefor, brake mechanism, a fluid pressure operated power actuator for actuating the brake mechanism, operatively connected with and deriving its power from the engine, valve mechanism for controlling the actuator, a foot lever operatively connected with said valve mechanism, and provided with a retracting spring normally holding the actuator and brake mechanism in off position, an independent emergency control device for actuating said valve mechanism, and cutting off the ignition, including electro-magnetic devices, a circuit therefor, a speedometer carried by the vehicle and provided with contacts in said circuit for actuating said electro-magnetic devices to apply the brakes automatically when the vehicle attains a predetermined speed, and release them when the speed falls below the predetermined speed, said engine being provided with a main ignition cut-out switch located out of reach of the driver of the vehicle, manually operated devices for bringing said emergency control device into operation, including a part located within reach of the driver of the vehicle, and a part located in a passenger compartment of the vehicle in reach of the passengers therein.

25. In an automotive vehicle, the combination with an internal combustion engine, a throttle valve therefor, a switch for cutting out the ignition mechanism of the engine, brake mechanism, a fluid pressure actuator therefor, valve mechanism for controlling said actuator, an operator operated control device for said valve mechanism, connections between said actuator and the throttle valve, for closing the throttle when the brake mechanism is applied, a signal device on said vehicle, an emergency control device for the actuator, the said signal and ignition cutout switch, means including a part extending into a passenger compartment of the vehicle for bringing into operation the emergency device, and an automatically operated control device connected with said actuator for operating the brake mechanism and closing the throttle, without operating said signal and switch.

26. In an automotive vehicle provided with an internal combustion engine for propelling the vehicle, having a suction passage for explosive mixture, and brake mechanism for the vehicle, a suction actuated device comprising a cylinder and a piston operatively connected with the brake mechanism, reversing valve mechanism for said actuator located in the piston, a longitudinally movable valve sleeve for operating said valve mechanism, means for connecting said valve mechanism with the suction passage of the engine and with the atmosphere, a brake operating lever located in position to be normally operated by the driver of the vehicle, operative connections from said lever to said valve actuating sleeve, yielding means for holding said lever and valve mechanism in off position, an independent emergency control device for the actuator, normally held in inoperative position and adapted to engage said valve actuating sleeve to effect its operation independently of the driver, and means located in a passenger compartment of the vehicle for bringing the emergency device into operation, said means being located out of reach of the driver.

27. In an automotive vehicle provided with an internal combustion engine, having a suction passage for explosive mixture, and a controlling valve in said passage, and brake mechanism for the vehicle, a suction actuated device and cylinder, and a piston connected with said brake mechanism, reversing valve mechanism for said actuator, means for connecting the reversing valve mechanism with said suction passage between the throttle valve and the cylinder, and for connecting the valve mechanism with the atmosphere, an operator operated part connected with said valve mechanism, and normally operated by the driver of the vehicle for applying the brakes, operative connections between the operator operated part and the throttle valve for effecting the closing of the throttle valve when the brakes are applied, and an emergency device normally out of operation for actuating the reversing valve mechanism and effecting the application of the brakes, and the closing of the throttle valve independently of the driver.

28. In an automotive vehicle provided with an internal combustion engine having a suction passage for explosive mixture, and a controlling valve in said passage, and brake mechanism for the vehicle, a suction actuated device and cylinder, and a piston connected with said brake mechanism, reversing valve mechanism for said actuator, means for connecting the reversing valve mechanism with said suction passage between the throttle valve and the cylinder, and for connecting the valve mechanism with the atmosphere, an operator operated part connected with said valve mechanism, operative connections between the operator operated part and the brake mechanism, including a provision for lost motion sufficient to insure the operation of the valve mechanism, whereby the said valve mechanism may be operated by the operator operated part in case of failure of power, means for closing the throttle valve when the brakes are applied, yielding retracting means for holding the reversing valve mechanism in off position, and an emergency device for operating said reversing valve mechanism independently of the operator operated part, to effect the operation of the brake mechanism and the closing of the throttle valve, and means located at a distance from the driver for bringing the emergency device into operation.

29. In an automotive vehicle, the combination with an internal combustion engine for driving the vehicle provided with a throttle valve, and brake mechanism for the vehicle, means for normally operating the brake mechanism, including a foot lever in position adapted to be operated by the driver, operative connections between said foot lever and the throttle valve, to effect the closing of the throttle valve when the brakes are applied, a normally inoperative emergency device for effecting the operation of the brake mechanism, and the pedal lever connected therewith, and simultaneously closing the throttle valve.

30. In an automotive vehicle provided with an internal combustion engine, having a controlling throttle valve, and brake mechanism for the vehicle, a power actuator for operating said brake mechanism, reversing valve mechanism for the actuator, a brake lever in position to be normally operated by the driver, connections between the pedal lever and said reversing valve mechanism, connections between said pedal lever and the throttle valve of the engine, an emergency device normally held in inoperative position, and adapted to operate the said reversing valve mechanism of the actuator, to apply the brakes and effect a movement of the pedal lever in a direction to close the throttle valve, and controlling means located in the vehicle, out of reach of the driver for bringing the emergency device into operation.

31. In an automotive vehicle provided with an internal combustion engine, having a controlling throttle valve, and brake mechanism for the vehicle, a power actuator for operating said brake mechanism, reversing valve mechanism for the actuator, an operator operated part connected with said valve mechanism and located in position to be normally operated by the driver, an emergency device normally held in inoperative position, and constructed to operate said reversing valve mechanism independently of the operator operated part, controlling means for said emergency device located in the vehicle at a distance from the driver, and operative connections between the power actuator and the throttle valve, constructed to effect the closing of the throttle when the brakes are applied either by the operation of the operator operated part, or by the emergency device.

32. In an automotive vehicle, the combination with brake mechanism, a power actuator therefor, valve mechanism for controlling said actuator, and an operator operated device normally operated by the driver for controlling said valve mechanism, an emergency control device located adjacent to the actuator and out of reach of the driver and passengers, for operating the valve mechanism of the actuator independently of the operator operated device, controlling means for the emergency device extending into the vehicle out of reach of the driver, and means for holding the emergency control device in operative position when moved thereto, whereby it cannot be restored to inoperative position until after the vehicle has been stopped.

33. In an automotive vehicle, the combination of brake mechanism, a fluid pressure operated power actuator comprising a cylinder and a piston operatively connected with the brake mechanism, controlling valve mechanism for the actuator, an operator operated part connected with the valve mechanism for operating it to move the piston to an extent proportionate to the extent of movement of the operator operated part, yielding means normally holding the operator operated part, valve mechanism, actuator and brake mechanism in released position, and an emergency control device, independent of said operator operated part, connected with said valve mechanism and constructed to effect the maximum stroke of the piston to apply the brake mechanism to the full extent.

34. In an automotive vehicle, the combination of brake mechanism, a fluid pressure operated power actuator comprising a cylinder and a piston operatively connected with the brake mechanism, controlling valve mechanism for the actuator, a valve actuating part movable with and with respect to the piston and connected with the valve mechanism, an operator operated part connected with said valve actuating part, for operating the valve mechanism to effect a stroke of the piston and application of the brakes proportionate to the movement of the operator operated part, and an emergency control device interposed between the valve actuating part and a part connected with the piston, for effecting and maintaining the relative movement of the valve actuating part with respect to the piston, to effect the maximum stroke of the piston and apply the brake mechanism to the full extent.

35. In an automotive vehicle, the combination of brake mechanism, a fluid pressure operated power actuator comprising a cylinder and a piston operatively connected with the brake mechanism, controlling valve mechanism for the actuator carried by the piston, a valve actuating part movable with and with respect to the piston and connected with the valve mechanism, an operator operated part connected with said valve actuating part, for operating the valve mechanism to effect a stroke of the piston and application of the brakes proportionate to the movement of the operator operated part, and an emergency control device, comprising a spring actuated part interposed between the valve actuating part and a part connected with the piston, means for normally holding said spring actuated part out of operation, and a connection from said holding means, and an independent operator operated part for releasing said holding means to effect the maximum stroke of the piston and the full application of the brakes.

36. In an automotive vehicle, the combination with brake mechanism, a fluid pressure operated power actuator for normally actuating the brake mechanism operatively connected therewith, valve mechanism for controlling said actuator, an operator operated part connected with the valve mechanism for operating the same under normal conditions, to effect the operation of the brake mechanism by said actuator, yielding means normally holding said operator operated part, valve mechanism, actuator and brake mechanism in off position, and an emergency device comprising valve actuating means operable at a point remote from the operator's position, for positively controlling the valve mechanism of the actuator to operate said actuator and apply the brakes independent of the operator operated part.

37. In an automotive vehicle, the combination with an internal combustion engine for driving the vehicle provided with a throttle valve, suction operated brake mechanism for the vehicle, means for normally operating said brake mechanism, means for normally controlling said throttle valve and a normally inoperative emergency device for effecting the operation of the brake mechanism and simultaneously closing the throttle valve independently of the said means for normally operating the brake mechanism and the means for normally controlling the throttle valve.

In testimony whereof we affix our signatures.

CALEB S. BRAGG.
VICTOR W. KLIESRATH.